(12) United States Patent
Polyakov

(10) Patent No.: US 7,428,218 B2
(45) Date of Patent: Sep. 23, 2008

(54) FLEXIBLE APPROACH FOR REPRESENTING DIFFERENT BUS PROTOCOLS

(75) Inventor: Evgeny Polyakov, Brookline, MA (US)

(73) Assignee: Teradyne, Inc., North Reading, MA (US)

( * ) Notice: Subject to any disclaimer, the term of this patent is extended or adjusted under 35 U.S.C. 154(b) by 305 days.

(21) Appl. No.: 10/608,588

(22) Filed: Jun. 27, 2003

(65) Prior Publication Data

US 2004/0057391 A1 Mar. 25, 2004

Related U.S. Application Data

(60) Provisional application No. 60/400,140, filed on Aug. 1, 2002.

(51) Int. Cl.
*G06F 11/00* (2006.01)
*H04L 12/26* (2006.01)

(52) U.S. Cl. .................. 370/241; 370/252; 370/465; 370/466; 370/467; 370/469; 700/9; 703/27

(58) Field of Classification Search ............ 370/241, 370/252, 387–389, 465–467, 469, 400–401; 709/223–224, 250, 220, 230; 700/100, 9, 700/19; 703/27
See application file for complete search history.

(56) References Cited

U.S. PATENT DOCUMENTS

| | | | | |
|---|---|---|---|---|
| 5,038,317 A | 8/1991 | Callan et al. | ................. | 364/900 |
| 5,056,060 A | 10/1991 | Fitch et al. | ................. | 364/900 |
| 5,111,450 A * | 5/1992 | Cooledge et al. | ............ | 714/712 |
| 5,175,536 A | 12/1992 | Aschlinan et al. | ...... | 340/825.04 |
| 5,243,273 A | 9/1993 | McAulife et al. | ....... | 324/158 R |
| 5,257,393 A | 10/1993 | Miller | ......................... | 395/800 |
| 5,263,149 A | 11/1993 | Winlow | ...................... | 395/500 |
| 5,349,685 A | 9/1994 | Houlberg | ..................... | 395/800 |
| 5,410,717 A | 4/1995 | Floro | ........................ | 395/800 |
| 5,440,697 A | 8/1995 | Boegel et al. | ............... | 395/500 |
| 5,615,136 A | 3/1997 | Baraton et al. | .............. | 364/578 |
| 5,727,149 A * | 3/1998 | Hirata et al. | ................ | 709/250 |
| 5,793,954 A * | 8/1998 | Baker et al. | ................. | 709/250 |

(Continued)

FOREIGN PATENT DOCUMENTS

WO 01/28060 4/2001

(Continued)

OTHER PUBLICATIONS

IEEE 1394 and the Windows Platform: The optimal PC interconnect bus for consumer electronic devices, De. 14, 2001.

(Continued)

*Primary Examiner*—Wing F. Chan
*Assistant Examiner*—Mark A. Mais
(74) *Attorney, Agent, or Firm*—Bruce D. Rubenstein

(57) ABSTRACT

A method for flexibly defining communication constructs includes providing at least one communication element type for at least one layer of a generalized communication model, such as a bus model. Each communication element type has a user-definable structure that is adaptable for representing a corresponding protocol layer of a target communication medium. Users can define specific communication element types to substantially represent the target protocol. Users can also define the communication element types to depart from the target protocol in precisely defined ways.

34 Claims, 3 Drawing Sheets

U.S. PATENT DOCUMENTS

| | | | |
|---|---|---|---|
| 5,826,030 A * | 10/1998 | Hebert | 709/228 |
| 5,970,430 A | 10/1999 | Burns et al. | |
| 6,266,700 B1 * | 7/2001 | Baker et al. | 709/230 |
| 6,560,235 B1 * | 5/2003 | Jones | 370/401 |
| 6,601,196 B1 * | 7/2003 | Dabral et al. | 714/43 |
| 6,618,774 B1 | 9/2003 | Dickens et al. | |
| 6,779,133 B2 | 8/2004 | Whetsel | |
| 6,829,672 B1 | 12/2004 | Deng et al. | |
| 6,892,262 B1 | 5/2005 | Taki | |
| 6,968,307 B1 | 11/2005 | Chrysanthakopoulos | |
| 7,333,484 B2 * | 2/2008 | Henderson et al. | 370/389 |
| 7,343,279 B2 * | 3/2008 | Truebenbach et al. | 703/27 |
| 2002/0083332 A1 | 6/2002 | Grawrock | |
| 2003/0056036 A1 * | 3/2003 | Carlton | 710/15 |

FOREIGN PATENT DOCUMENTS

| | | |
|---|---|---|
| WO | WO 01 28060 A | 4/2001 |

OTHER PUBLICATIONS

ANONYMOUS: "Reference Manual: Model 2108; VXI Serial Data System Digital Resource Module"--Online-, Feb. 8, 2001, Talon Instruments, XP002274335.

ANONYMOUS: "Application Note #2; Model 2108; 1553 Serial Bus Emulation"--Online-, 2001, Talon Instruments, XP002274336.

ANONYMOUS: "Reference Manual: Model 2108; TX01/RX01 Interconnect Modules"--Online-, Jan. 24, 2001, Talon Instruments, XP002274337.

* cited by examiner

FLEXIBLE APPROACH FOR REPRESENTING DIFFERENT BUS PROTOCOLS

CROSS-REFERENCES TO RELATED APPLICATIONS

This patent application claims priority to provisional patent application No. 60/400,140, filed Aug. 1, 2002.

STATEMENT REGARDING FEDERALLY SPONSORED RESEARCH OR

DEVELOPMENT: Not Applicable.
Reference to Microfiche Appendix: Not Applicable

BACKGROUND OF THE INVENTION

1. Field of the Invention

This invention relates generally to electronic communications, and, more particularly, to data constructs for representing and manipulating communication protocols.

2. Description of Related Art

A universal bus test instrument has recently been developed for exercising a wide variety of serial busses that operate with different interface specifications and protocols. U.S. patent application Ser. No. 10/325,070, entitled "Universal Approach for Simulating, Emulating, and Testing a Variety of Serial Bus Types," describes certain aspects of this instrument, and is herein incorporated by reference. The incorporated application and the instant application are both based on provisional applications that were filed on the same day. Neither application is prior art to the other.

The incorporated patent application defines the protocol and behavior of a generic serial bus through the use of a "bus model." As described, the bus model breaks down a serial bus protocol into separate generic layers that are common to all busses. For any particular target bus, the bus model expresses the target bus protocol in terms of the generic layers, and assigns bus-specific attributes to each generic layer. The bus model thus forms an abstract representation of the target bus protocol in terms of the generic layers.

FIG. 1 shows a block diagram of the bus model 100. The layers of the bus model include, for example, frames (112/132), messages (114/134), words (116/136), fields (118/138), symbols (120/140), sequences (122/142), encoding (124/144), and timing (126/146).

Prior bus test instruments have been primarily bus-specific. Instruments have been designed for exercising one or more particular types of busses but were not usable for exercising other types of busses. Consequently, the communication constructs that these instruments used included only the structures needed for communicating with the specifically supported bus. They were not adaptable for other types of busses.

FIG. 2 shows a typical communication construct used by a bus-specific test instrument of the prior art. For illustrative purposes, a communication construct for a MIL-STD-1553 bus test instrument is shown. The instrument supports a set of bus-specific message types 210. The message types 210 prescribe high level operations that can be conducted on the target bus. For the 1553 bus, these message types include, among others, a Bus Controller to Remote Terminal message type (BC-RT), a Remote Terminal to Bus Controller message type (RT-BC), and a Remote Terminal to Remote Terminal message type (RT-RT).

Each of the message types 210 consists of words. In general, the target bus specification prescribes a set of word types for performing various bus operations. For the 1553 bus, three distinct word types 212 are provided: Command Word, Data Word, and Status Word.

Words consist of fields. The identities and locations of fields within words are fixed by the definition of the target bus. As shown in FIG. 2, a 1553 Command Word 216 consists of six fields 214. These fields include, as defined by the 1553 standard, Sync, RT Address, Transmit/Receive, SubAddress Mode, Data Word Count/Mode Count, and Parity.

The bus-specific constructs of the prior art each support message types and word types needed for exercising a particular target bus. They are generally limited, however, to the protocols of the respective target busses. They do not provide users with a way of defining different sets of message types or word types for different types of busses. What is needed is a more flexible way of defining bus communication.

BRIEF SUMMARY OF THE INVENTION

With the foregoing background in mind, it is an object of the invention to allow users to flexibly define communication constructs for interacting with target busses or other communication media.

To achieve the foregoing object, as well as other objectives and advantages, a method for flexibly defining communication constructs includes providing at least one communication element type for at least one layer of a generalized communication model, such as a bus model. Each communication element type has a user-definable structure that is adaptable for representing a corresponding protocol layer of a target communication medium. Users can define specific communication element types to substantially represent the target protocol. Users can also define the communication element types to depart from the target protocol in precisely defined ways.

BRIEF DESCRIPTION OF THE DRAWINGS

Additional objects, advantages, and novel features of the invention will become apparent from a consideration of the ensuing description and drawings, in which—

DETAILED DESCRIPTION OF THE PREFERRED EMBODIMENT

The generic communication construct according to the invention departs from bus-specific constructs of the prior art by allowing users to define communication element types of their own choosing. The communication element types represent different layers of the bus model. These communication element types include, for example, message types, word types, and field types. Other communication element types can be created as well to represent other layers of the bus model. Users can define these communication element types for existing busses or for future busses.

Figure 1:
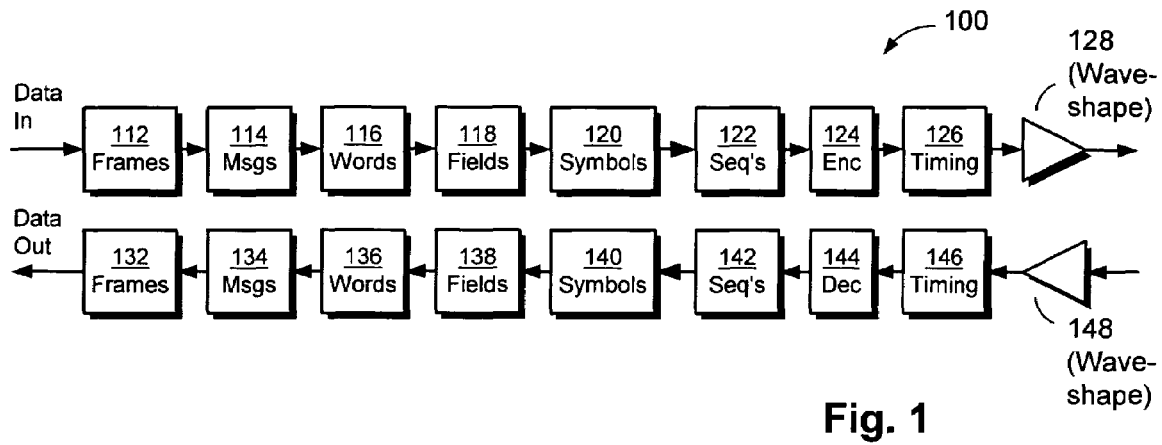
FIG. 1 is a conceptual block diagram of a generic bus model.
Figure 2:
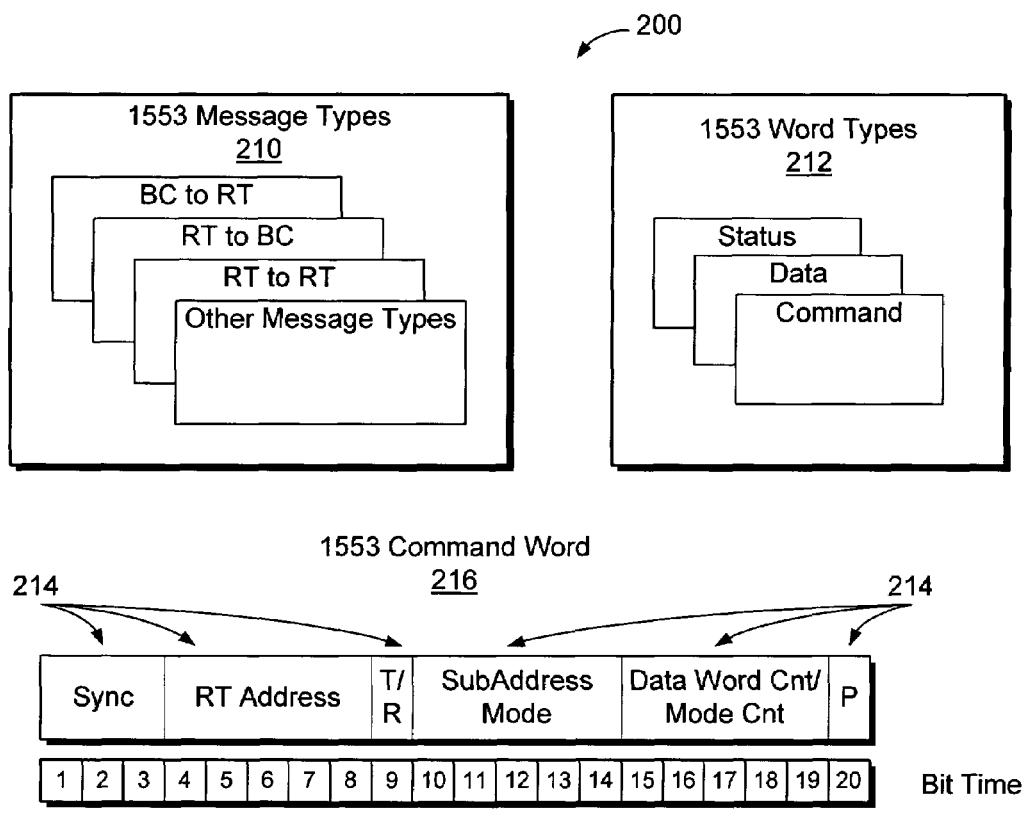
FIG. 2 is a diagram illustrating portions of the communication construct of the MIL-STD-1553 bus according to the prior art.
Figure 3:
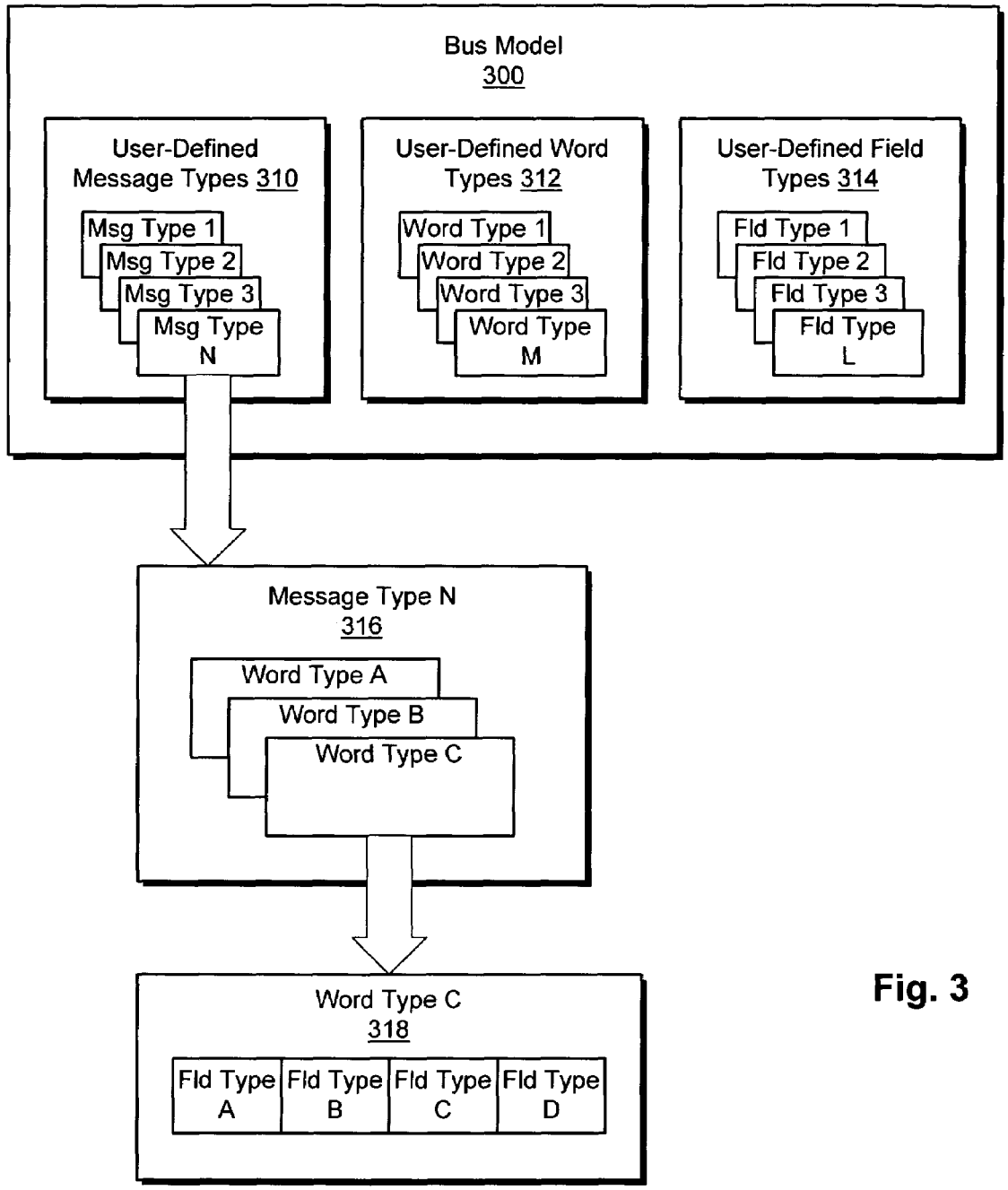
FIG. 3 is a diagram illustrating portions of a flexible communication construct according to the invention.

FIG. 3 shows an embodiment of a generic communication construct according to the invention. Like the prior art, the construct of FIG. 3 includes message types (e.g., message types 310), word types (e.g., word types 312), and field types (e.g., field types 314). Each message type includes at least one word type, and each word type includes at least one field type.

The construct of FIG. 3 differs markedly from the prior art, however, in its degree of flexibility. Of particular significance in attaining this flexibility is the bus model 300. As indicated above, the bus model is a generic layered structure for representing any serial bus specification. Different instances of the bus model can be created for communicating with different bus types. Each bus model instance defines communication element types that are tailored to a particular type of bus.

The bus model 300, or any instance thereof, includes a set of message types 310. Unlike the message types of the prior art, which had fixed definitions, the message types 310 have user-definable structures. For each message type, users can define a name and an ordered group of word types that constitute some meaningful communication over the target bus. For example, a user might create a Message Type N (316) consisting of word types A, B, and C. Word Types A, B, and C can be any of the word types (1 through M) defined in the bus model, and the sequence of Word Types A, B, and C performs some useful function. Users can define as many message types as they wish.

The message types for a bus may typically correspond to the messages defined by the protocol of the bus, i.e., the bus type's standard message types. However, message types can have broader applications. Users can develop custom message types to manage specific testing scenarios. Therefore, although message types are generally consistent with the target bus protocol, they need not be limited to the specific messages that the protocol defines.

User-defined message types may also be structured differently from the message types defined in the protocol of the target bus. For instance, the protocol might define a complex message, which is more easily expressed in the bus model as a sequence of simpler or different messages. Therefore, there is no need for a direct one-to-one relationship between the messages defined in the bus protocol and those found in the bus model.

The bus model 300 includes a set of user-defined word types 312. Each word type is defined by a name and a group of field types. For example, Word Type C (part of Message Type N) may be defined to include Field Types A, B, C, and D. Users can define as many word types as they wish.

Field types are also included in the bus model 300. Field types define more concrete aspects of bus communication than message types or word types. We have found that field types are used for only a limited number of purposes. For simplicity, it is not necessary to provide users with infinite flexibility in defining the characteristics of field types. Instead, users define field type characteristics by assigning a field designation. In the preferred embodiment, users may assign each field types one of the following field designations:

TABLE 1

Field Designations

| Field Designation | Description |
| --- | --- |
| User-specified data | The user specifies the value for these fields during the test definition time or at runtime. Examples of such fields include address, subaddress (e.g., for 1553 command words), as well as the data portion (e.g., for a 1553 data word). |
| Constant data | The user specifies the value for these fields when defining the bus model. Like user-specified data fields, these fields are considered to be a part of the "value" of the word, or the data carried by the word, but the user cannot change them either at test definition time or at runtime. Examples of such fields include the transmit/receive bit in 1553 command words, or the subaddress/mode code field (which is fixed to be all ones or all zeros) for the 1553 mode code command words. |
| Special symbol | These fields are included in the word, but are not considered to be part of the word payload. They are generally not 1's or 0's, but rather some unusual level or condition. For example, this could be a 1553 command or data sync. The user specifies the value for these fields during bus model definition, and cannot change this value either at test definition time or at runtime. |
| Constant non-data | These fields are included in the word, but are not considered to be part of the word payload. These fields are similar to special symbol fields in their intention, but their value can consist of regular symbols (like 1 and 0), not just the special ones. Examples include start bits and stop bits. |
| Parity | This one-bit field designation represents parity. Parity can be either odd or even. Parity is not considered to be part of the data portion of the word. Parity is preferably calculated (on the transmit end) and verified (on the receive end) at runtime. |
| CRC | This field designation represents cyclic redundancy checking. Users can specify the CRC polynomial. CRC is not considered to be part of the data portion of the word. CRC is preferably calculated (on the transmit end) and verified (on the receive end) at runtime. |

It is apparent from Table 1 that some field types have fixed values, such as those designated as Constant Data, whereas others have variable values, such as those designated as Parity or CRC. The specific value of a fixed field is preferably specified in the respective bus model (see "Value" setting in Table 2 below).

Field types, word types, and message types essentially form distinct structures that can be combined to build up higher level structures. For instance, the same field types can be used in different combinations to build different word types, and the same word types can be used in different combinations to build different message types. Even message types can be combined to form higher level constructs (e.g., transactions such as 1553 command-response transactions).

Definitions of the communication element types may be implemented in numerous ways. For example, they may be implemented in a single computer file, in different computer files, in hardware, or in any combination of these. In the preferred embodiment, the communication element types are provided in the form of bus files in XML format. The bus file identifies communication element types with "tags." For example, a different tag is used for each field type, for each word type, and for each message type. The following code section shows a generalized example of field type definitions in a bus file:

```
<Fields [fields attributes]>
    <Field Name = "Field 1" [field type settings] />
    <Field Name = "Field 2" [field type settings] />
    ...
    <Field Name = "Field L" [field type settings] />
</Fields>
```

Within any bus file, word types are also represented using XML tags. Bus files preferably define word types using the following format:

```
<Words [Words attributes]>
    <Word Name = "Word 1" />
    <Word Name = "Word 2" />
    ...
    <Word Name = "Word M" />
</Words>
```

Each word type consists of a group of field types. As is known, XML supports hierarchical arrangements of tags, wherein certain tags may be subordinate to other tags. Accordingly, subordinate tags may be used to indicate the field types that "belong to" a specific word type. For example, a bus file may represent the field types that constitute a user-defined word type, "UserWord," as follows:

```
<Word Name = "UserWord" >
    <WordField FieldName = "Field Type A" />
    <WordField FieldName = "Field Type B" />
    <WordField FieldName = "Field Type C" />
</Word>
```

Field types A, B, and C are the field types, preferably defined elsewhere in the bus file, that constitute the "UserWord" word type.

Bus files also use tags to represent message types. Message types may be represented as follows:

```
<Messages>
    <Message Name = "Message Type 1" [message type settings] />
    <Message Name = "Message Type 2" [message type settings] />
    ...
    <Message Name = "Message Type N" [message type settings] />
</Messages>
```

Subordinate tags may be used to define the word types that constitute a message type. For example, the word types that constitute "MyMessage" may be defined as follows:

```
<Message Name = "MyMessage" [message type settings]>
    <MessageWord WordName = "Word Type A">
    <MessageWord WordName = "Word Type B">
    <MessageWord WordName = "Word Type C>
</Message>
```

Word types A, B, and C are the specific words that constitute "MyMessage," and are preferably defined elsewhere in the bus file.

Message types, word types, and field types may each provide settings for further defining bus characteristics and behaviors. XML allows users to specify tag attributes. Bus files make use of these tag attributes to define the settings of the data types.

Message types provide "Variable Length" settings that allow users to specify whether a message consists of a fixed number of words or a variable number of words. For variable length messages, maximum and minimum length settings are also provided. Word types and field types may also provide variable length settings.

Users can establish various settings for field types. The following settings are provided in the preferred embodiment:

TABLE 2

Field Settings

| Field Setting | Description |
| --- | --- |
| Name | The name referenced during word-type definition and test definition. |
| Width | The field width specified in bit times. The field width can be variable. |
| Type | One of the "Field designations" from Table 1. |
| Transmit Order | A setting that determines if the MSB or the LSB is first. |
| Bit Stuffed | A Boolean that determines if bit stuffing applies to this field. |
| Include in Error Check | A Boolean that determines if this field should be included in error checking when the instrument calculates parity or CRC. |
| Special Symbol | If this field is of type special symbol, then the actual special symbol to be used is specified here. |
| Value | If this field is either of type constant data or constant non-data, then the actual value of the field is specified here. |

The use of communication element types, for defining message types, word types, and field types, provides users with a great deal of flexibility in structuring communication over a bus. Users can define fields for a bus, construct words out of specific fields, and construct messages out of specific words.

Given this flexibility, many opportunities arise for improving the quality of testing. For instance, users have broad abilities to perform fault injection in testing bus devices. Users can define field types, word types, and message types in ways that deliberately violate the protocol or specification of a bus. For testing purposes, a field can be defined as having too many bits or too few bits. A word can be defined as having too many fields or too few fields, or by having fields in the wrong locations within the word. Given the flexible, user-defined structure of messages, words, and fields, there are enormous possibilities for deviating from a bus protocol, in a controlled manner, to observe a device's response.

Figure 4:
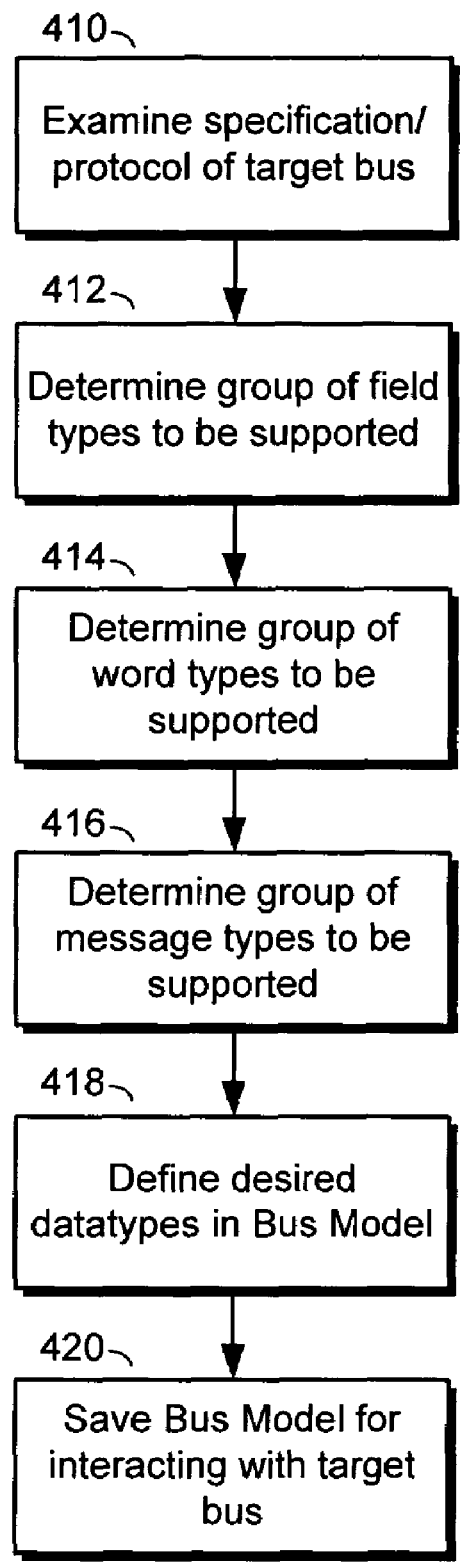
FIG. 4 is a flowchart of a process according to the invention for defining certain data types for bus communication within a bus model.

This flexibility also enables users to create new bus models for new types of busses, including custom busses. FIG. 4 shows a process for creating a new bus model. At step 410, a user examines the specification of the target bus. At steps 412-416, the user determines the specific field types, word types, and message types to be supported, based on the specification of the target bus and the user's particular testing needs. At step 418, the user creates definitions for the desired field types, word types, and message types in a bus file for the target bus. The user then saves the bus file (step 418), where it can be accessed for interacting with the instrument.

Users need not generally create a new bus file from scratch each time one is needed. Different busses share many similar characteristics. Owing to the simplicity of the bus file (i.e., as an XML file), users can often create new bus files simply by copying existing ones and modifying a few settings.

The data types described herein, i.e., message types, word types, and field types, exist essentially as definitions within a bus file. These definitions can be brought into action for actually exercising a physical bus through the concept of "instances." As is known, an instance is a specific expression of a particular type. A "message instance" is therefore a specific expression of a message type. Similarly, a "word instance" is a specific expression of a word type, and a "field instance" is a specific expression of a field type. These instances can be regarded more generally as "communication element instances."

One may draw a parallel between the communication element types of a bus file and user defined data types provided in certain computer languages. For instance, the "C" computer language provides a "typedef" instruction for creating specific data types. Instances of a data type may be created in a computer program by declaring variables of that type. The computer program can then access and manipulate the instances of that type at runtime.

Communication element types of a bus file work much the same way. Users specify these types and can create instances of them to be used and manipulated in the context of a program. For example, computer software can be used to create an instance of MyMessage. The program can then manipulate the instance of MyMessage by establishing its settings, specifying its data, etc. The manipulated instance of MyMessage can then be transmitted or received for conducting the specific transfers defined by its words and fields.

Since message types are hierarchical constructs that include in their definitions constituent word types and field types, it is evident that "message instances" include not only instances of the messages themselves, but also instances of their constituent word types and field types. In the preferred embodiment, the bus test instrument includes a software API (applications program interface) that allows users to create message instances. Each message instance has a software "handle" and is persisted in memory. The API can access the message instance via its handle to manipulate its data or execute the message instance.

Users preferably communicate with the API using function calls. In the preferred embodiment, the bus test instrument is a VXI instrument and the API is implemented with a VXI plug-and-play driver.

Two types of message instances can be created for message types: transmit message instances and expect message instances. Transmit message instances are used to send information over the bus. Expect message instances are used for receiving information over the bus. Expect message instances are similar to transmit message instances in that expect message instances also define the structure of blocks of information that appear on a bus or other communication medium.

But while transmit message instances require users to provide the data to be transmitted, expect message instances require that the users specify only the structure of the expected data (e.g., word types and timing) and not the data itself. For testing purposes, however, one may specify expect data for expect message instances, i.e., data expected over the bus. Expect data can be compared with data actually received to determine whether expected results were obtained.

For both transmit and expect message instances, it is desirable to provide users with control over the timing of messages. Preferably, message type definitions found in a bus model contain default timing values. Message instances may either use or supercede those defaults. In the preferred embodiment, users may specify the following timing characteristics for message types or message instances:

a delay to be enforced before the message instance can be transmitted, referred to as a premessage gap. Premessage gap definition includes the specification of the point of time from which the delay should be enforced, which includes end of last transmitted word, end of last received word, or any other event is the system a delay to be enforced between the words of the message being transmitted, referred to as the preword gap a timeout for receiving the beginning of the expected message, referred to as the begin message timeout. Similar to the premessage gap this specification can include a flexible definition of the point of time when this time period starts.

a timeout for receiving any word of the expected message, referred to as the word gap timeout.

a period of time to check for to follow the expected message to guarantee that the message ended properly, referred to as the trailing gap.

Common timing defaults for the entire bus protocol, i.e. affecting multiple message types, can be provided as well. Such defaults include intermessage gap, interword gap, response time, no response timeout, no word timeout, as well as minimum and maximum values for any of these. Preferably, any of these defaults may be used for any of the message timing settings mentioned above.

Having described one embodiment, numerous alternative embodiments or variations can be made. For example, as disclosed above, reference is made to message types, word types, and field types. However, other communication element types may be used to represent additional layers of a communication protocol. For example, one may wish to implement a "transaction type," which includes a group of message types. Therefore, the invention is not limited to the three communication element types disclosed.

In addition, some communication protocols do not define all the layers of the bus model. For instance, RS-232 does not define message types. The invention still applies to these busses, however, by supporting user-definable elements for other layers that the protocol does support. It should be understood, therefore, that the invention still applies where a bus does not support all the communication element types disclosed herein.

The concept of "busses" has a broad definition. Nevertheless, it is apparent from the foregoing that the user-definable communication element types can be applied to any communication medium, regardless of whether it is formally considered to be a "bus." Therefore, the invention is not strictly limited to busses.

Moreover, the communication element types have been described herein as corresponding to specific layers of a generic bus model. But the invention is not limited to use with the particular bus model disclosed. Rather, the invention can be applied wherever a generic, layered model for communications can be described, regardless of its form.

The use of communication element types has been described in connection with bus testing. It is evident, however, that the invention applies in various contexts and is not limited to use with any particular instrument or with instruments in general. The concept of user-definable communication element types may be applied for simulating, emulating, or testing communications media. It may be used for communicating over a bus, for example via a general I/O circuit that can assume the protocol of any desired bus. It may also be used simply for representing or describing bus structure and behavior.

Therefore, while the invention has been particularly shown and described with reference to the preferred embodiments thereof, it will be understood by those skilled in the art that various changes in form and detail may be made therein without departing from the spirit and scope of the invention.

What is claimed is:

1. A method of testing equipment operatively connected to a target medium having a protocol, comprising:
    providing a plurality of communication element types hierarchically representing different communication elements of the protocol, each communication element type being a user-defined instantiable software data type pertaining to a particular layer of the protocol;
    providing an electronic instrument for operatively connecting to the equipment over the target medium;
    providing a software program for controlling the electronic instrument;
    instantiating, by the software program, one of the plurality of communication element types to create a transmit message instance within the software program, the transmit message instance being a specific expression of the respective communication element type;
    instantiating, by the software program, one of the plurality of communication element types to create an expect message instance within the software program, the expect message instance being a specific expression of the respective communication element type;
    manipulating the transmit message instance within the software program;
    manipulating the expect message instance within the software program;
    directing, by the software program, the electronic instrument to transmit a message to the equipment according to the manipulated transmit message instance and to receive a message from the equipment according to the manipulated expect message instance; and
    comparing the message received from the equipment with expected results to determine whether expected results were obtained,
    wherein at least some communication element types relating to higher layers of the protocol include references to one or more communication element types relating to lower layers of the protocol.

2. A method as recited in claim 1, wherein the step of providing a plurality of communication element types comprises defining one or more of the plurality of communication element types responsive to exchanges allowed by the protocol of the respective target medium.

3. A method as recited in claim 1, wherein at least one of the plurality of communication element types defines a structure for transmitting data over the target medium.

4. A method as recited in claim 1, wherein at least one of the plurality of communication element type defines a structure for receiving data over the target medium.

5. A method as recited in claim 1, wherein at least one communication element type is a message type that includes a portion for holding message data associated with instances of the respective message type.

6. A method as recited in claim 5, wherein the message data has a fixed length.

7. A method as recited in claim 5, wherein the message data has a variable length.

8. A method as recited in claim 1, wherein at least one of the communication element types has a fixed portion that is the same for all instances of the communication element type.

9. A method as recited in claim 1, wherein the plurality of communication element types includes at least one message type, and each instance of the message type includes a portion for prescribing timing.

10. A method as recited in claim 9, wherein the timing includes a setting for specifying a pre-message gap.

11. A method as recited in claim 9, wherein the timing includes a setting for specifying a pre-word gap.

12. A method as recited in claim 9, wherein the timing includes a setting for specifying a begin message timeout.

13. A method as recited in claim 9, wherein the timing includes a setting for specifying a trailing gap.

14. A method of as recited in claim 1, wherein the step of manipulating the transmit message instance comprises:
    establishing at least one characteristic of the transmit message instance by the software program.

15. A method as recited in claim 14, wherein the at least one characteristic includes a timing characteristic.

16. A method as recited in claim 1, further comprising:
    saving the plurality of communication element types in a computer readable format.

17. A method as recited in claim 1,
    wherein the plurality of user-definable communication element types include message types, word types, and field types,
    wherein at least one message type includes a reference to at least one word type, and
    wherein at least one word type includes a reference to at least one field type.

18. A method as recited in claim 11, further comprising creating multiple instances of one of the plurality of communication element types.

19. A method as recited in claim 18, further comprising processing each of the multiple instances for exchanging information on the target medium.

20. A method as recited in claim 14, further comprising creating multiple instances of one of the plurality of communication element types in the software program.

21. A method as recited in claim 20, further comprising, varying characteristics of each of the multiple instances created in the software program in different ways.

22. A method of communicating over a target medium having a protocol that supports the use of messages and words, comprising:
    providing a plurality of message types and a plurality of word types for representing communications using the protocol, each of the plurality of message types and each of the plurality of word types being a user-definable data type represented in software;
    providing an electronic instrument operatively connecting to the target medium for communicating over the target medium;
    providing a software program for controlling the electronic instrument;

arranging the plurality of message types and the plurality of word types hierarchically, with at least one message type including a reference to at least one word type;

instantiating the at least one message type by the software program to create at least one message instances, each message instance being a specific expression of the respective message type and including an instance of each word type included by reference in the respective message type, each included instance of a word type being a specific expression of the respective word type; and operating the software program to control the electronic instrument to direct communications over the target medium, responsive to the at least one message instance.

23. A method as recited in claim 1, wherein the step of instantiating one of the plurality of communication element types to create a transmit message instance comprises the software program accessing a software applications program interface (API).

24. A method as recited in claim 1, wherein the step of instantiating one of the plurality of communication element types to create a transmit message instance comprises the software program accessing a VXI plug-and-play driver.

25. A method of communicating over a target medium having a multi-layered protocol, comprising:

providing a software program;

defining a first plurality of communication element types, accessible by the software program and representing different communication elements for a first layer of the protocol;

defining a second plurality of communication element types, accessible by the software program and representing different communication elements for a second layer of the protocol, the second layer being lower than the first layer;

including, within the definition of at least one of the first plurality of communication element types, a reference to at least one of the second plurality of communication element types;

instantiating one of the first plurality of communication element types to create a communication element instance thereof within the software program, the communication element instance including an instance of each of the second plurality of communication element types referenced by said one of the first plurality of communication element types, each instance being a specific expression of the respective communication element type;

manipulating at least one of the communication element instances within the software program; and executing the software program to communicate over the target medium according to the manipulated communication element instance.

26. A method as recited in claim 25, wherein the first layer of the protocol pertains to messages and the second layer of the protocol pertains to words.

27. A method as recited in claim 25, further comprising:

defining a third plurality of communication element types, accessible by the software program and representing different communication elements for a third layer of the protocol, the third layer being lower than the second layer; and including, within the definition of at least one of the second plurality of communication element types, a reference to at least one of the third plurality of communication element types.

28. A method as recited in claim 27, wherein the first layer of the protocol pertains to messages, the second layer of the protocol pertains to words, and the third layer of the protocol pertains to fields.

29. A method as recited in claim 25, wherein the first and second plurality of communication element types are stored in a computer-readable file.

30. A method as recited in claim 25, wherein the first and second plurality of communication element types are implemented with XML code.

31. A computer-implemented system for communicating over a target medium having a multi-layered protocol, comprising:

an electronic instrument connected to the target medium;

a software program stored in memory for controlling the electronic instrument;

a bus model file accessible by the software program and including a first plurality of communication element types representing different communication elements for a first layer of the protocol; and a second plurality of communication element types representing different communication elements for a second layer of the protocol, the second layer being lower than the first layer, each of the first and second plurality of communication element types being an instantiable software data type, and at least one of the first plurality of communication element types including a reference to at least one of the second plurality of communication element types; and a software API (applications program interface), accessible by the software program, for creating communication element instances based on the first and second plurality of communication element types, said communication element instances including at least one first communication element instance within the software program, each being a specific expression of a respective one of the first plurality of communication element types; and at least one second communication element instance within the software program, each being a specific expression of one of the second plurality of communication element types included by reference in a respective first communication element type, wherein the electronic instrument is constructed and arranged for communicating over the target medium responsive to said at least one first communication element instance and said at least one second communication element instance.

32. A computer-implemented system as recited in claim 31, wherein the first and second plurality of communication element types are implemented using nested software tags.

33. A computer-implemented system as recited in claim 32, wherein the bus model file is an XML file.

34. A computer-implemented system as recited in claim 31, wherein the bus model file further includes a third plurality of communication element types, accessible by the software program and representing different communication elements for a third layer of the protocol, the third layer being lower than the second layer, and at least one of the second plurality of communication element types including a reference to at least one of the third plurality of communication element types.

* * * * *